(12) United States Patent
Muramatsu et al.

(10) Patent No.: US 7,773,308 B2
(45) Date of Patent: Aug. 10, 2010

(54) WIDE-ANGLE ZOOM LENS

(75) Inventors: Yuichi Muramatsu, Saitama (JP);
Dayong Li, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 12/320,464

(22) Filed: Jan. 27, 2009

(65) Prior Publication Data
US 2009/0190233 A1 Jul. 30, 2009

(30) Foreign Application Priority Data
Jan. 28, 2008 (JP) ............................. 2008-016269

(51) Int. Cl.
*G02B 15/14* (2006.01)
(52) U.S. Cl. ........................ 359/680; 359/689
(58) Field of Classification Search ................ 359/676, 359/680, 683, 686, 689
See application file for complete search history.

(56) References Cited

U.S. PATENT DOCUMENTS

| 4,170,402 | A | 10/1979 | Nakagawa |
| 5,325,236 | A | 6/1994 | Tanaka |
| 7,589,907 | B2 * | 9/2009 | Yamamoto ................. 359/686 |

FOREIGN PATENT DOCUMENTS

| JP | 53-103753 | 9/1978 |
| JP | 02-259614 | 10/1990 |
| JP | 04-275515 | 10/1992 |
| JP | 2006-301393 | 11/2006 |

* cited by examiner

*Primary Examiner*—Darryl J Collins
(74) *Attorney, Agent, or Firm*—Jacobson Holman PLLC

(57) ABSTRACT

The present invention is directed to a wide-angle zoom lens that attains the field of view ranging from 80 to 115 degrees in field angle with the zooming power of 2× or even higher, and that is capable of approximately compensating for various types of aberration such as spherical aberration, aberration of distortion, astigmatism and the like. The wide-angle zoom lens of multi groups of lens pieces, namely, a 1st lens group of negative refractivity, a 2nd lens group of negative refractivity, and a 3rd lens group of positive refractivity varies the power from the wide-angle end to the telephoto end with the 1st and 2nd lens groups coming closer to each other, and the 2nd and 3rd lens groups being varied in interval therebetween. The zoom lens attains the widest field of view of 80 degrees or over in field angle in the relations as expressed in the following formula:

$$2.0 < ft/fw \qquad (1)$$

where fw is a focal length of the entire optics when the zoom lens gets set at the wide-angle end, and ft is the focal length of the entire optics at the telephoto end.

3 Claims, 16 Drawing Sheets

FIG. 2
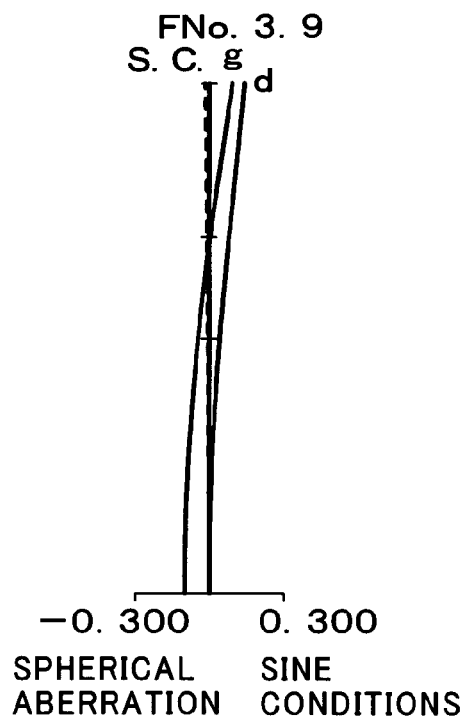
SPHERICAL ABERRATION / SINE CONDITIONS
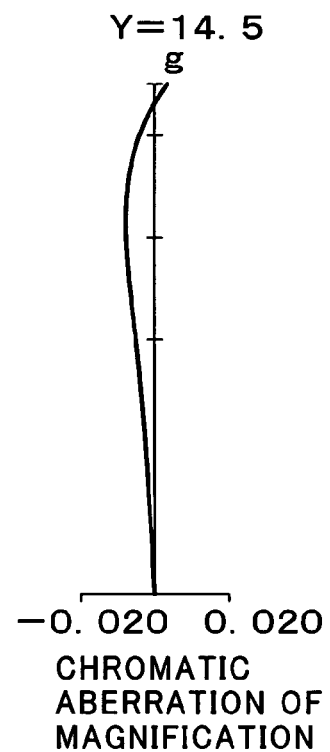
CHROMATIC ABERRATION OF MAGNIFICATION
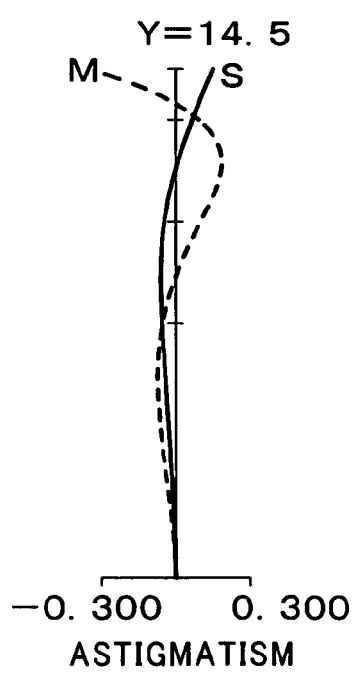
ASTIGMATISM
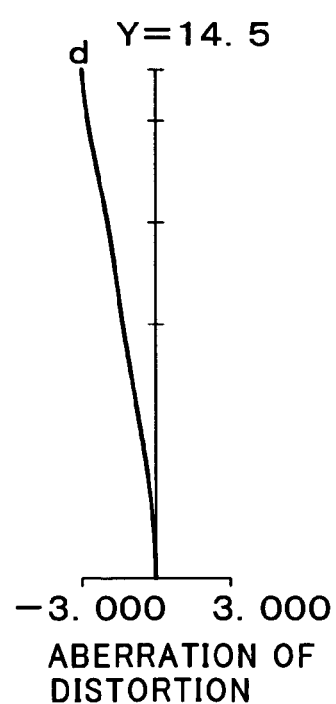
ABERRATION OF DISTORTION

FIG. 3
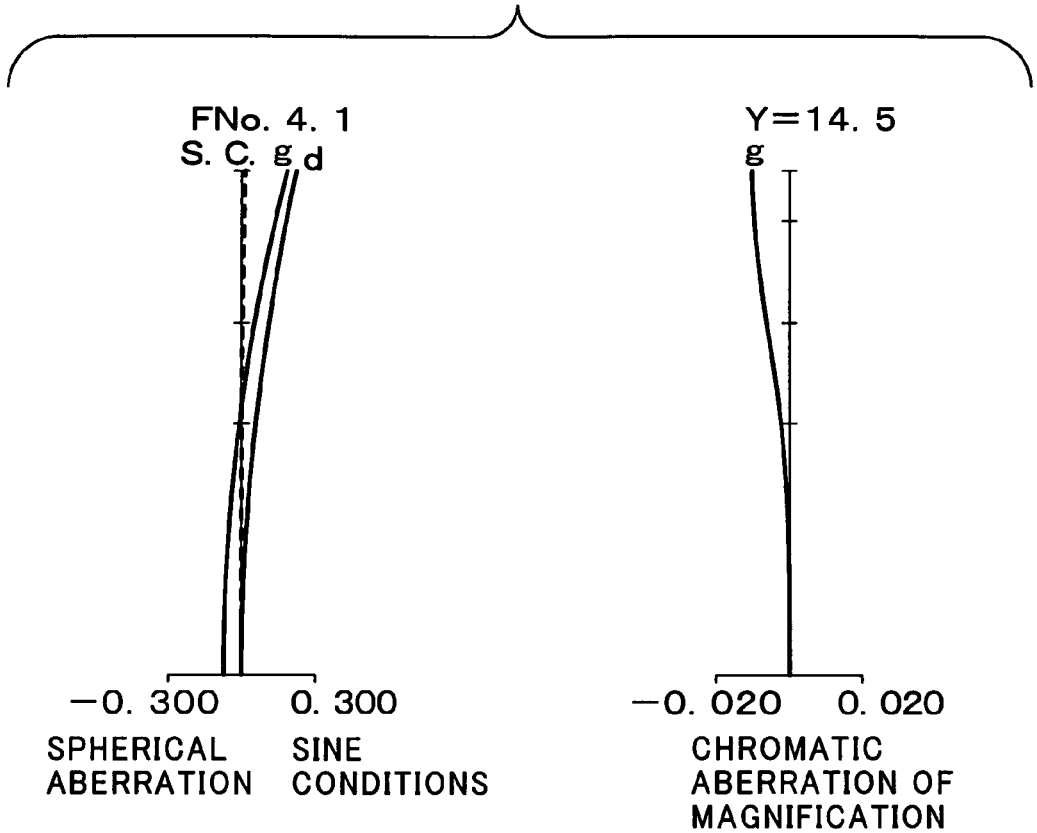
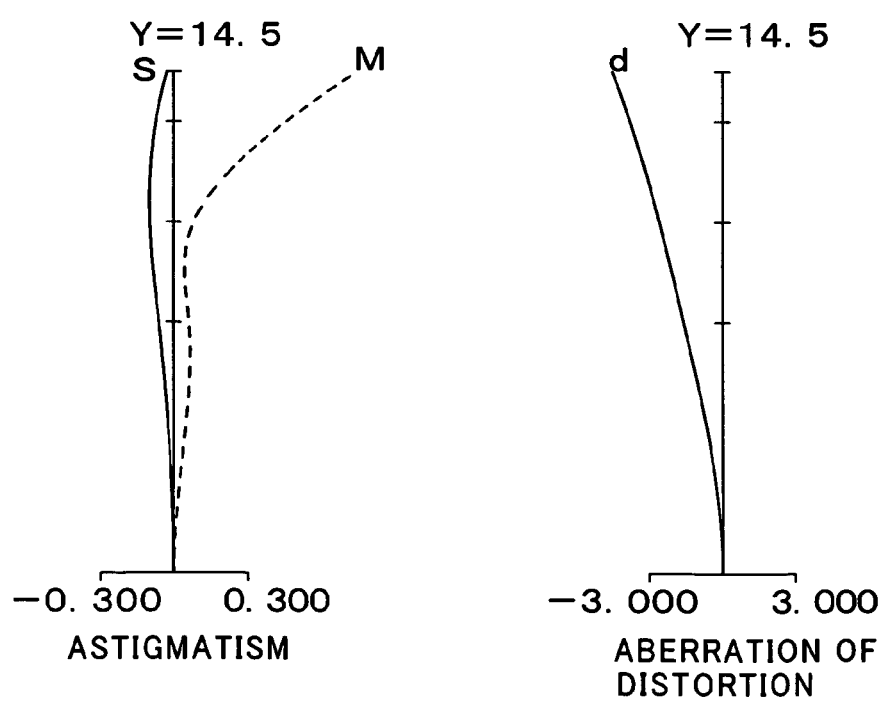

FIG. 4
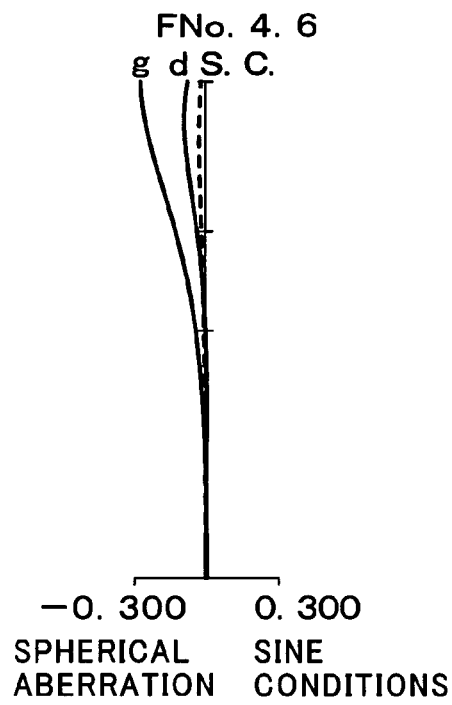
SPHERICAL ABERRATION / SINE CONDITIONS
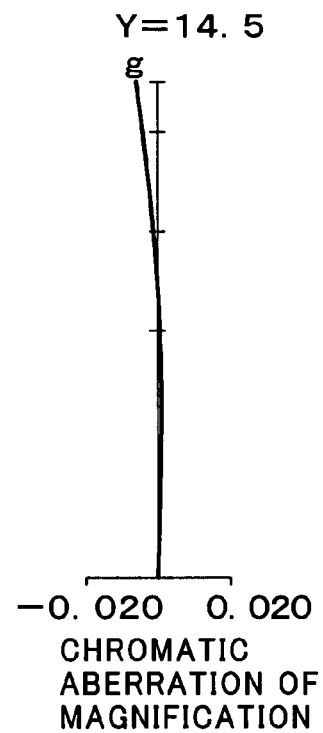
CHROMATIC ABERRATION OF MAGNIFICATION
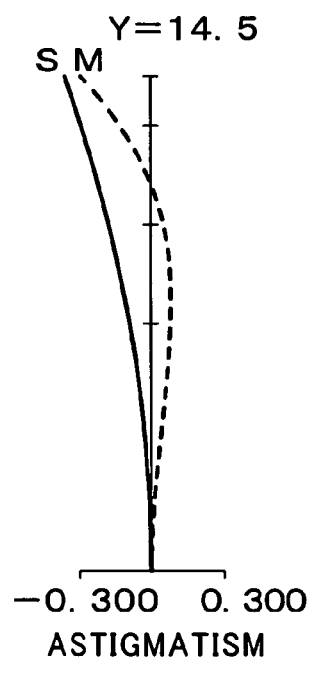
ASTIGMATISM
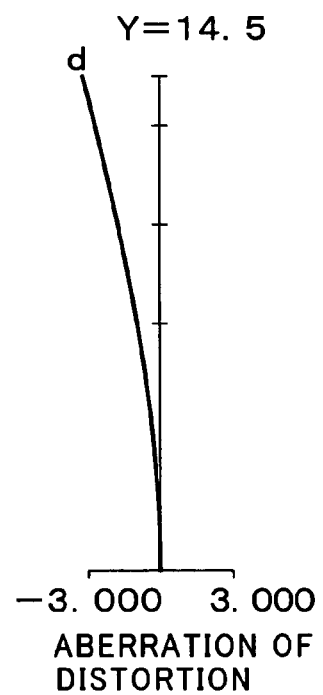
ABERRATION OF DISTORTION

FIG. 6
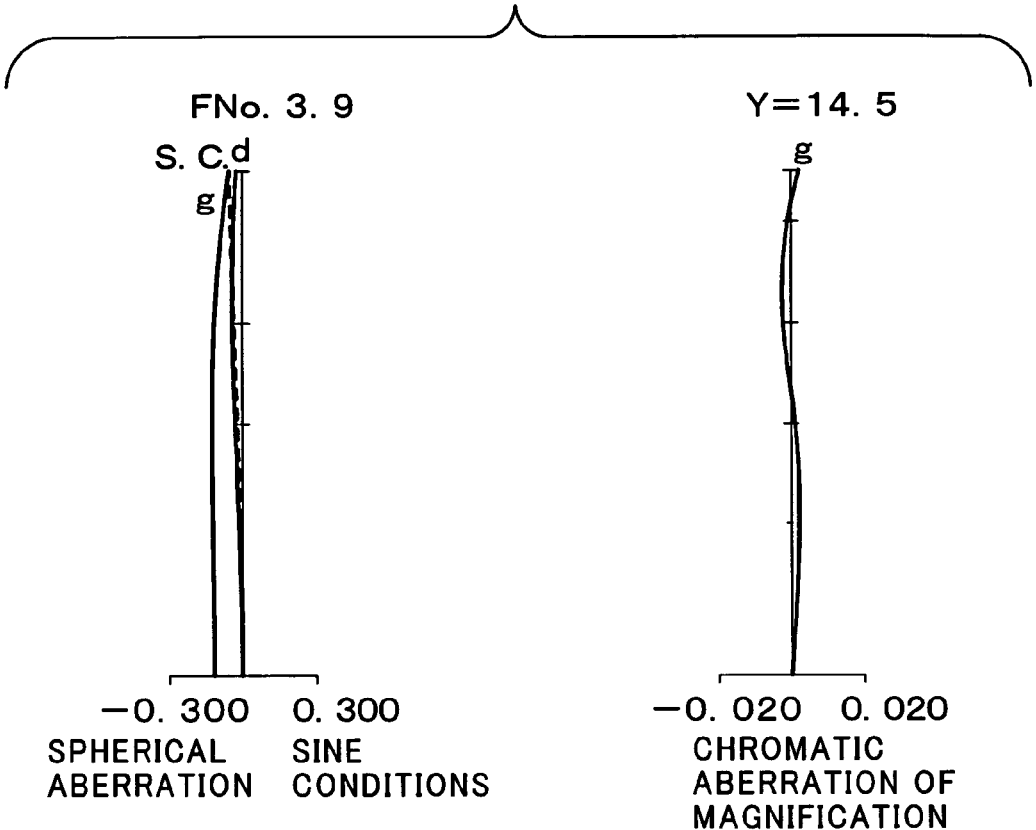
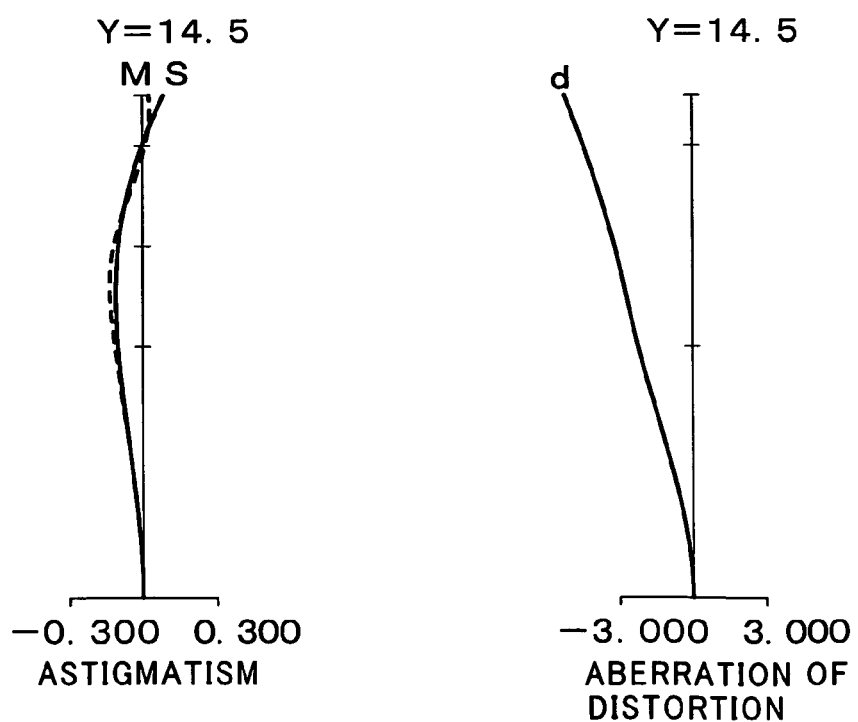

FIG. 7
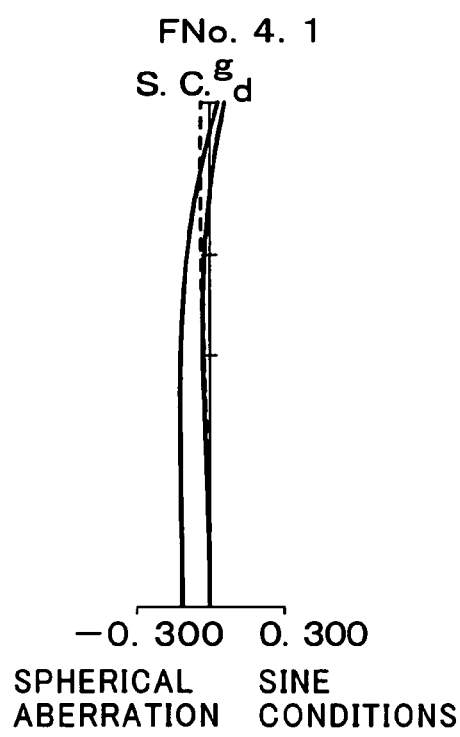
FNo. 4.1
SPHERICAL ABERRATION    SINE CONDITIONS
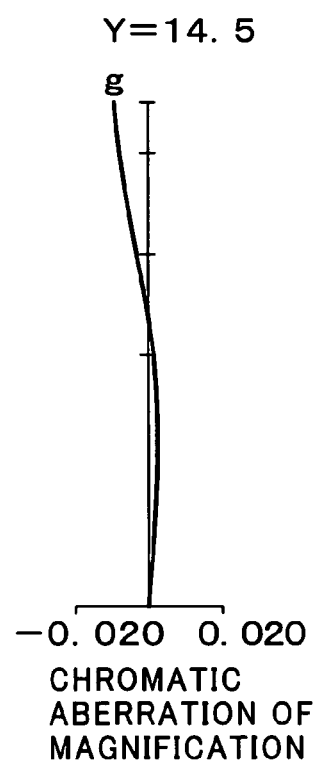
Y=14.5
CHROMATIC ABERRATION OF MAGNIFICATION
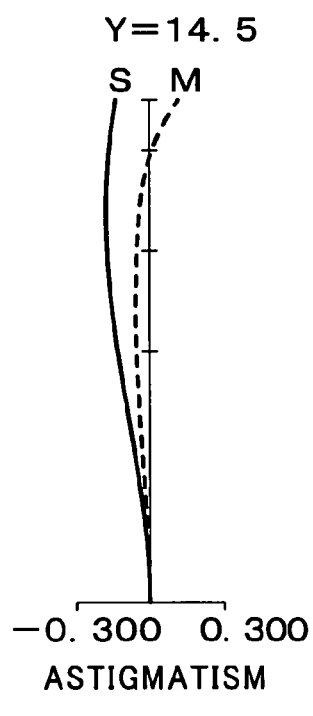
Y=14.5
ASTIGMATISM
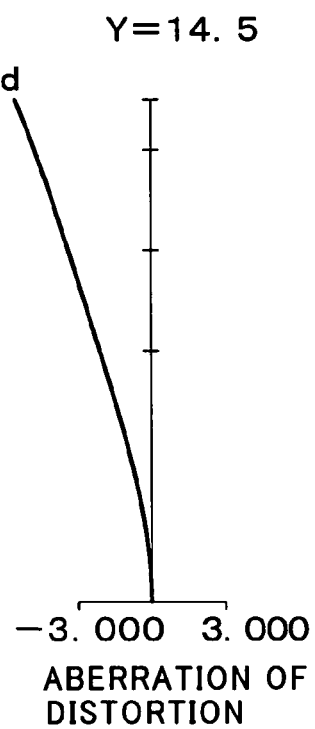
Y=14.5
ABERRATION OF DISTORTION

FIG. 8
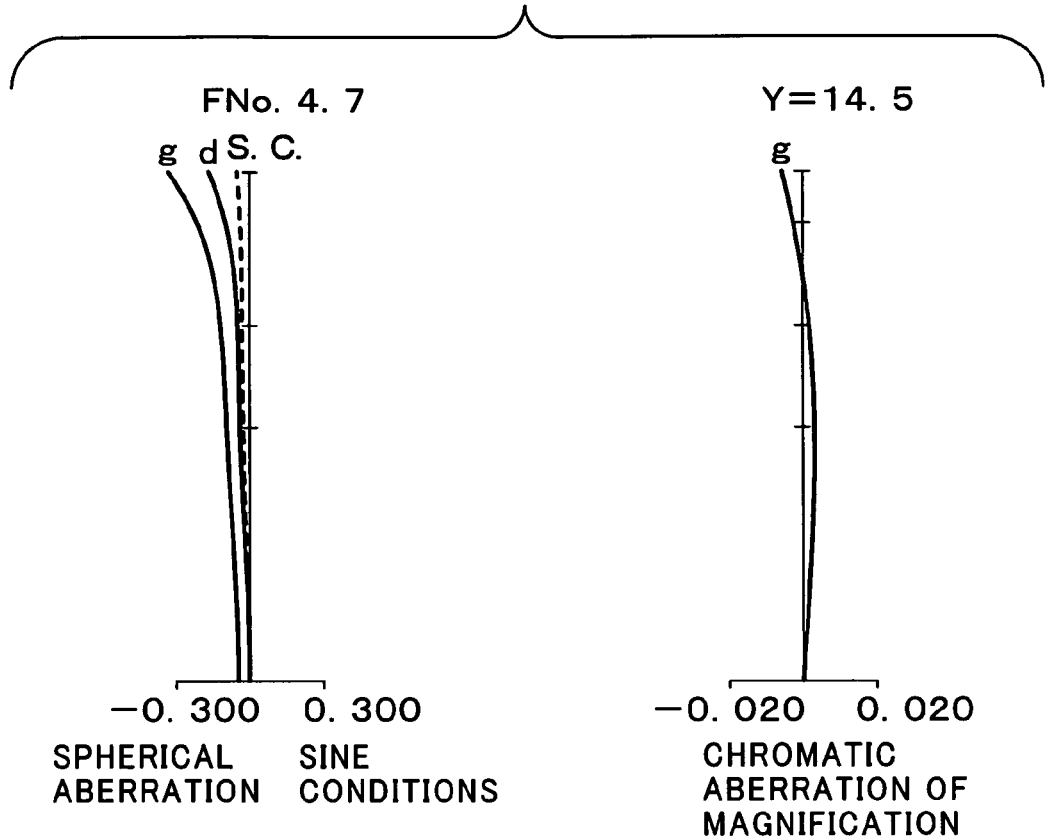
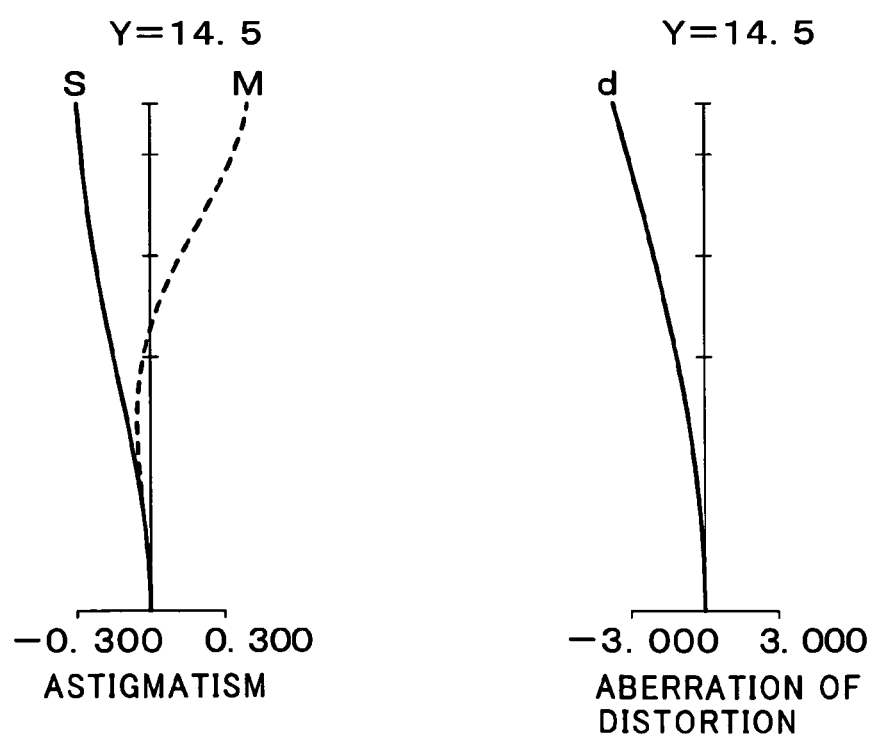

FIG. 10
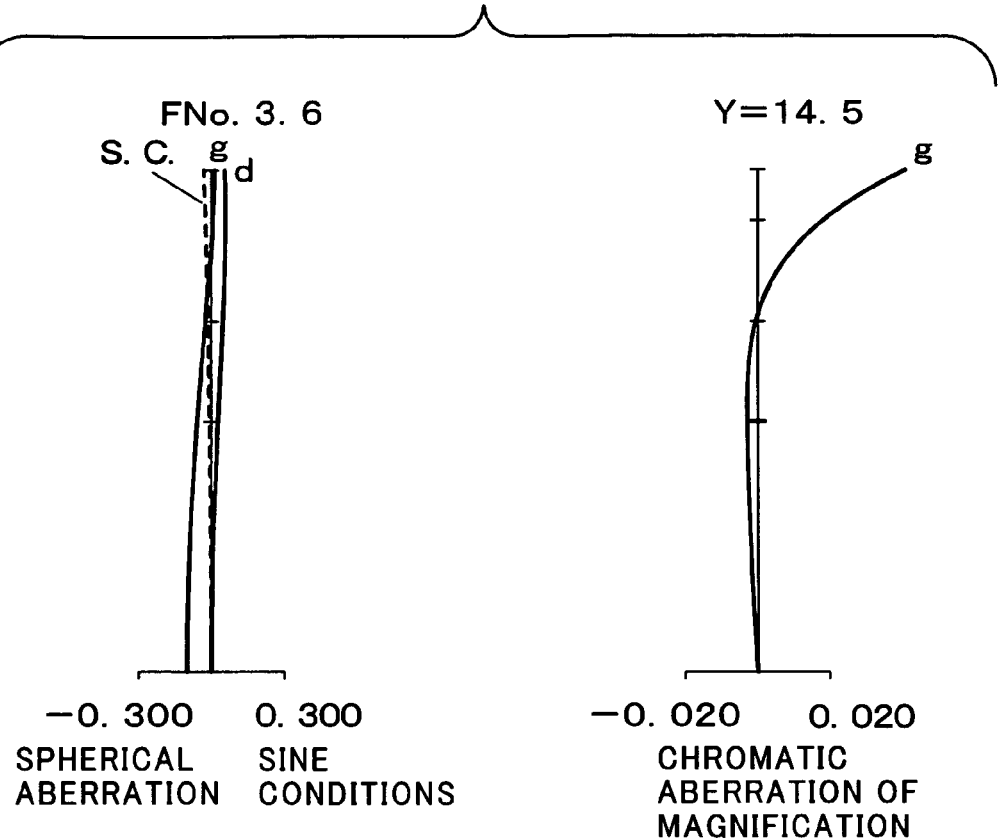
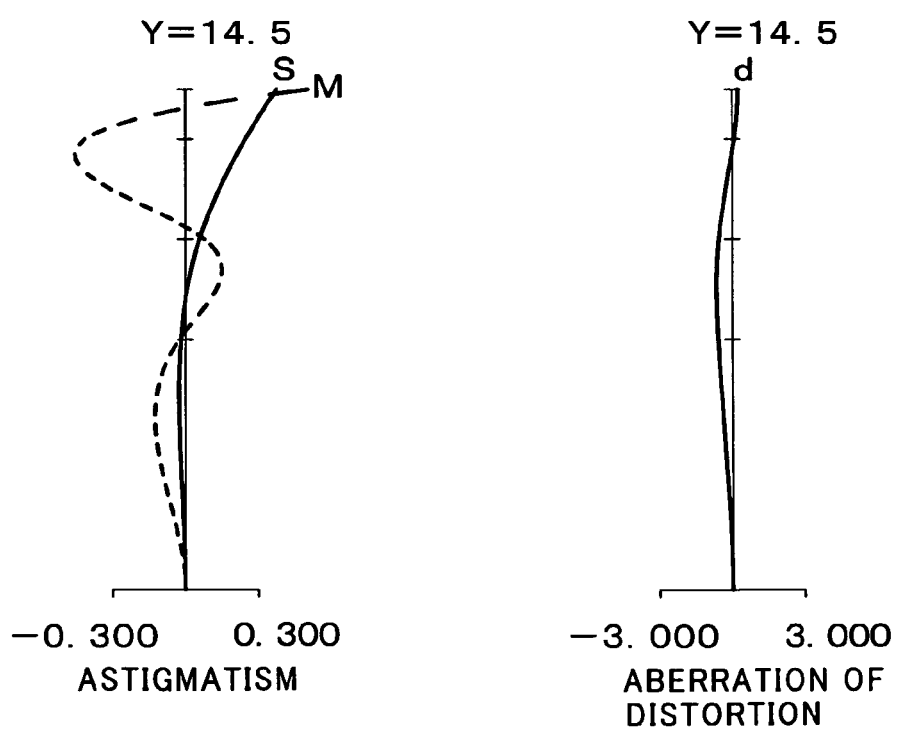

FIG. 11
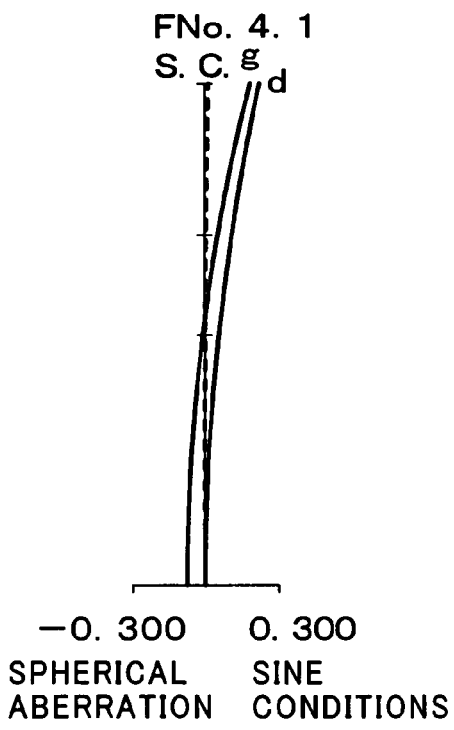
FNo. 4.1
S.C. g d
−0.300   0.300
SPHERICAL   SINE
ABERRATION   CONDITIONS
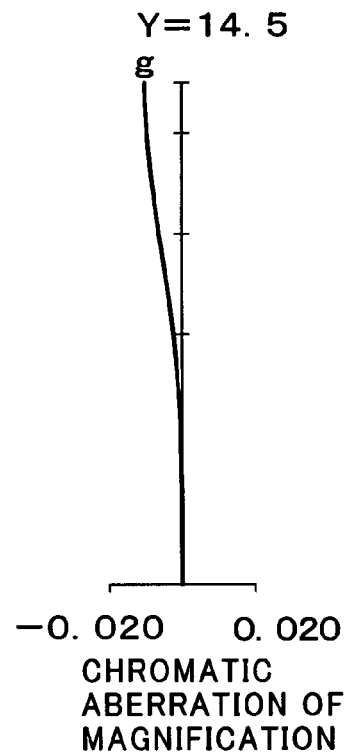
Y=14.5
g
−0.020   0.020
CHROMATIC
ABERRATION OF
MAGNIFICATION
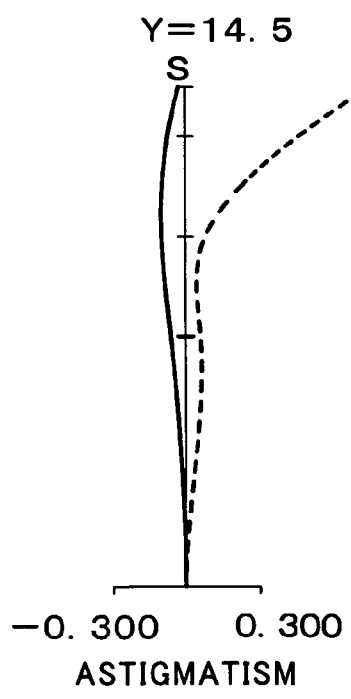
Y=14.5
S   M
−0.300   0.300
ASTIGMATISM
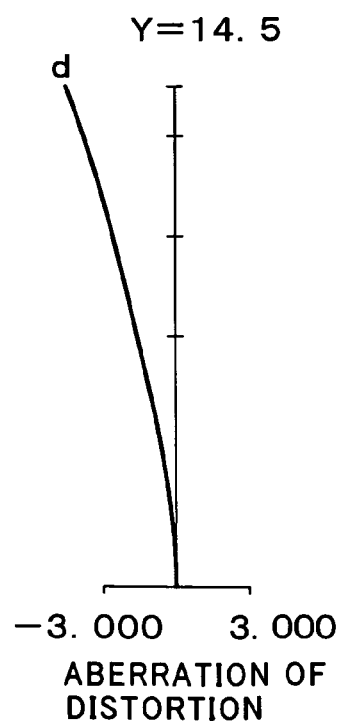
Y=14.5
d
−3.000   3.000
ABERRATION OF
DISTORTION

FIG. 12
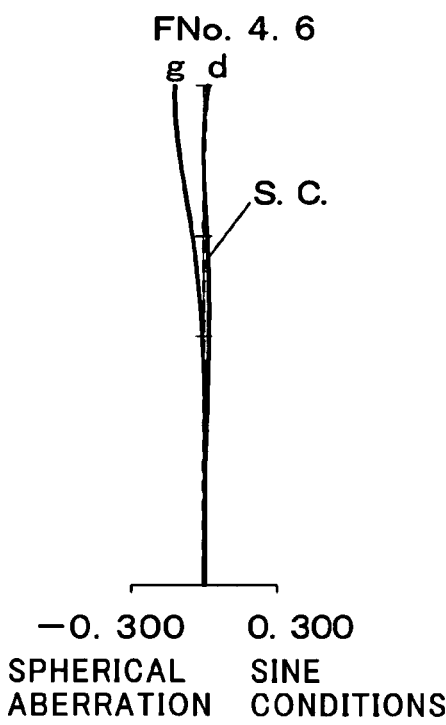
FNo. 4.6
−0.300   0.300
SPHERICAL   SINE
ABERRATION  CONDITIONS
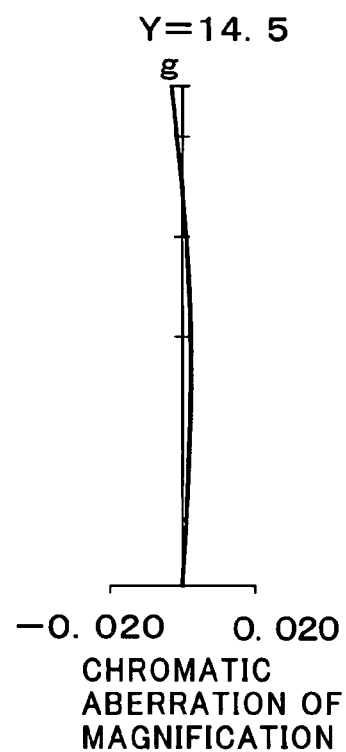
Y=14.5
−0.020   0.020
CHROMATIC
ABERRATION OF
MAGNIFICATION
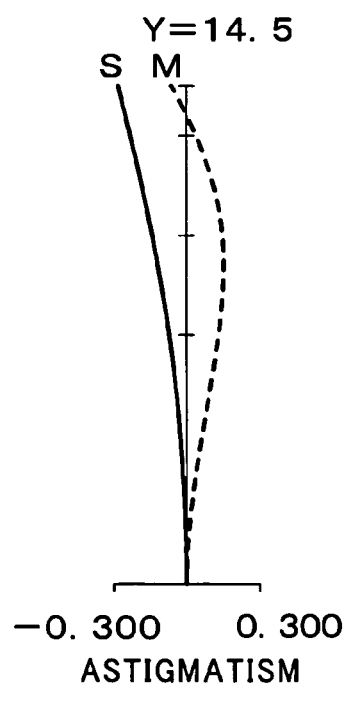
Y=14.5
−0.300   0.300
ASTIGMATISM
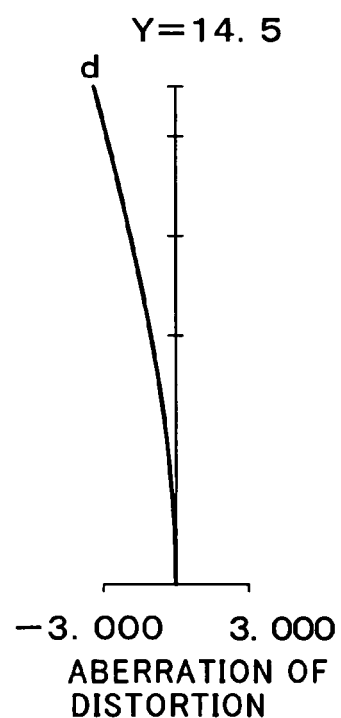
Y=14.5
−3.000   3.000
ABERRATION OF
DISTORTION

FIG. 14
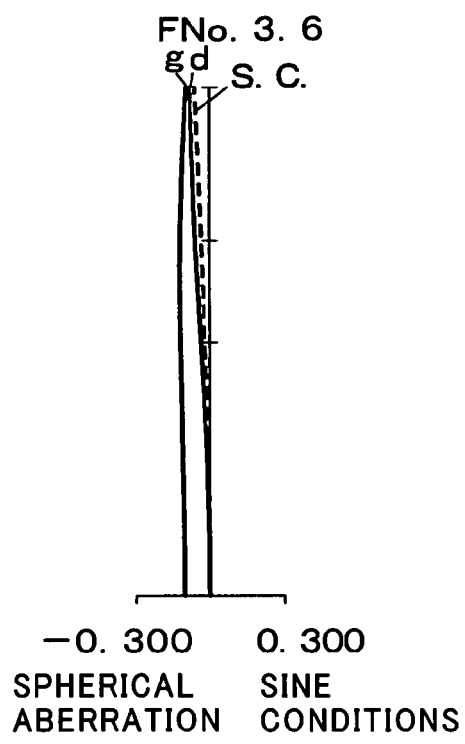
−0.300   0.300
SPHERICAL  SINE
ABERRATION CONDITIONS
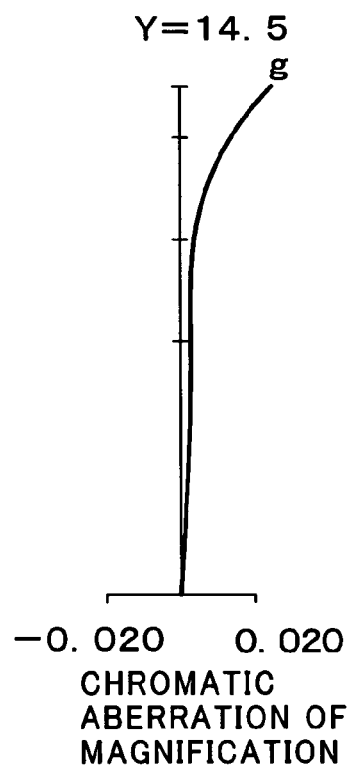
−0.020   0.020
CHROMATIC
ABERRATION OF
MAGNIFICATION
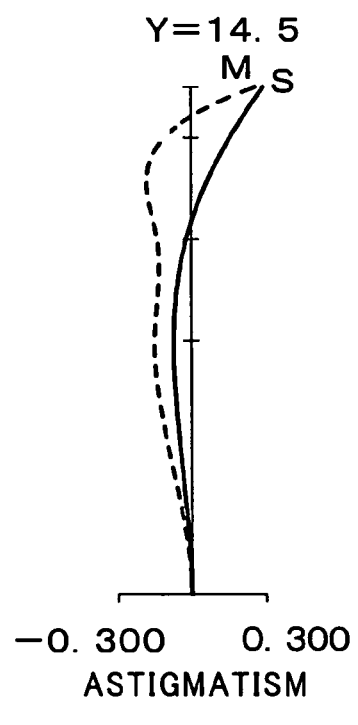
−0.300   0.300
ASTIGMATISM
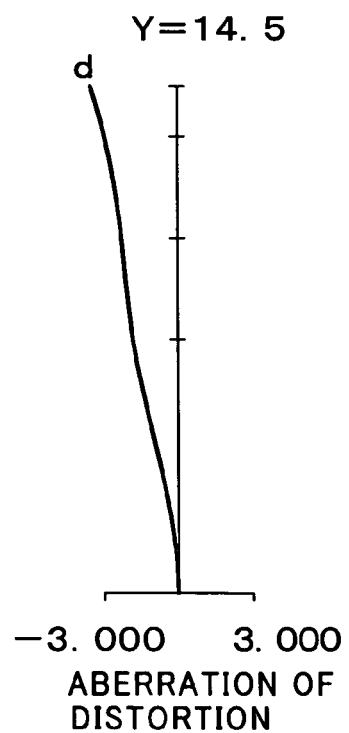
−3.000   3.000
ABERRATION OF
DISTORTION

FIG. 15
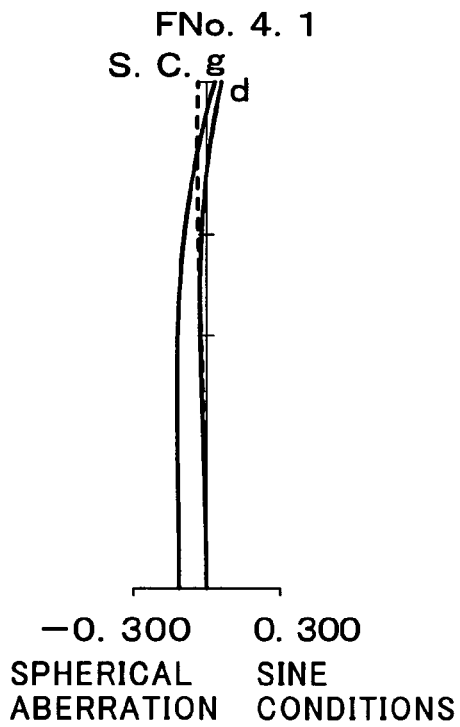
FNo. 4.1
S.C. g / d
−0.300  0.300
SPHERICAL ABERRATION
SINE CONDITIONS
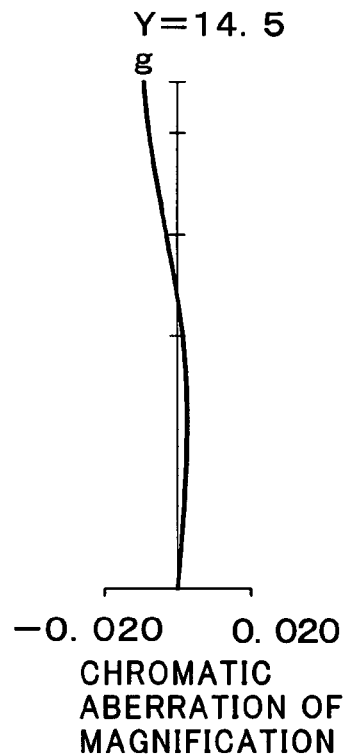
Y=14.5
g
−0.020  0.020
CHROMATIC ABERRATION OF MAGNIFICATION
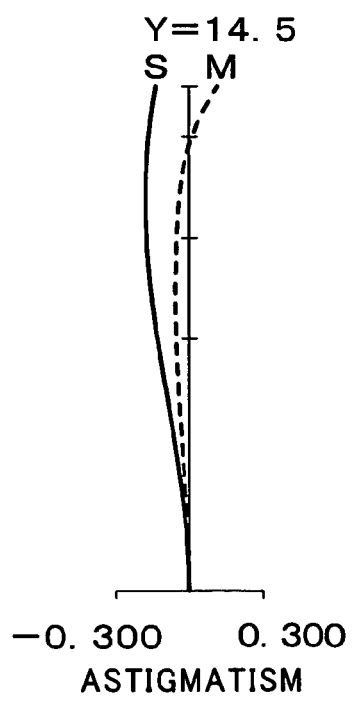
Y=14.5
S  M
−0.300  0.300
ASTIGMATISM
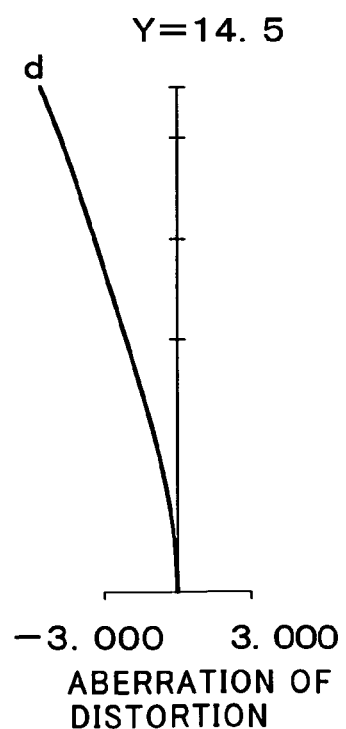
Y=14.5
d
−3.000  3.000
ABERRATION OF DISTORTION

FIG. 16
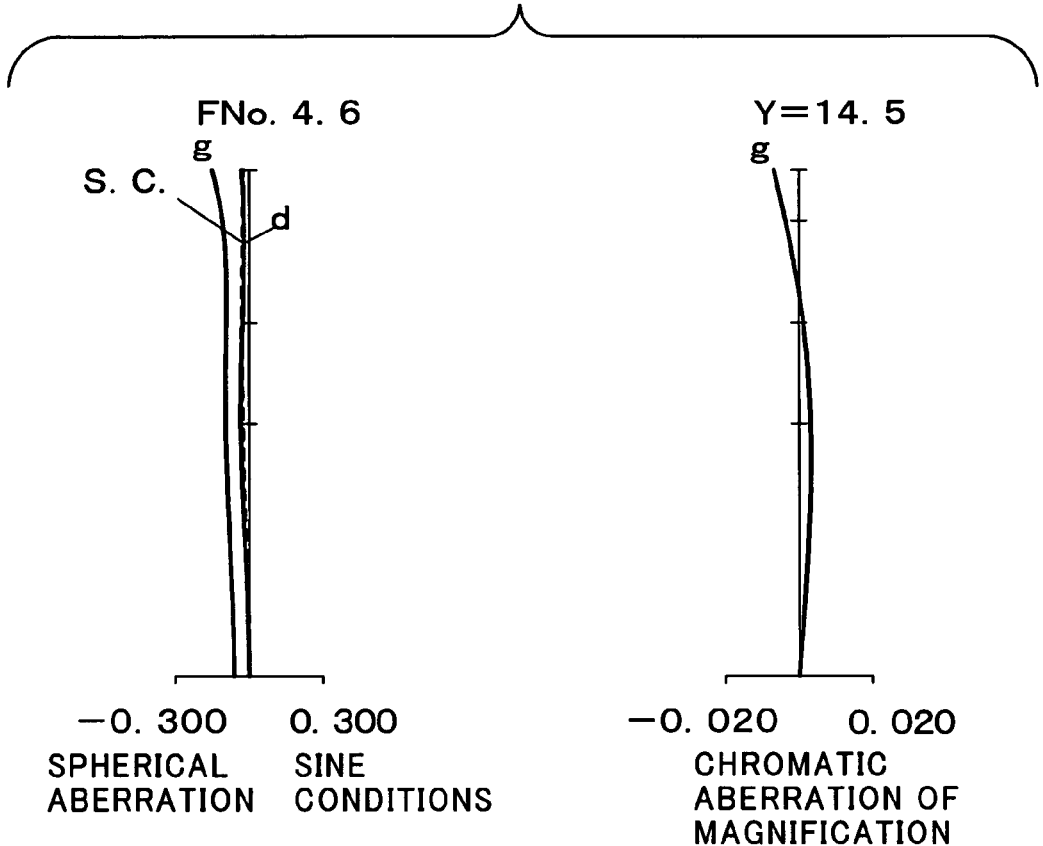
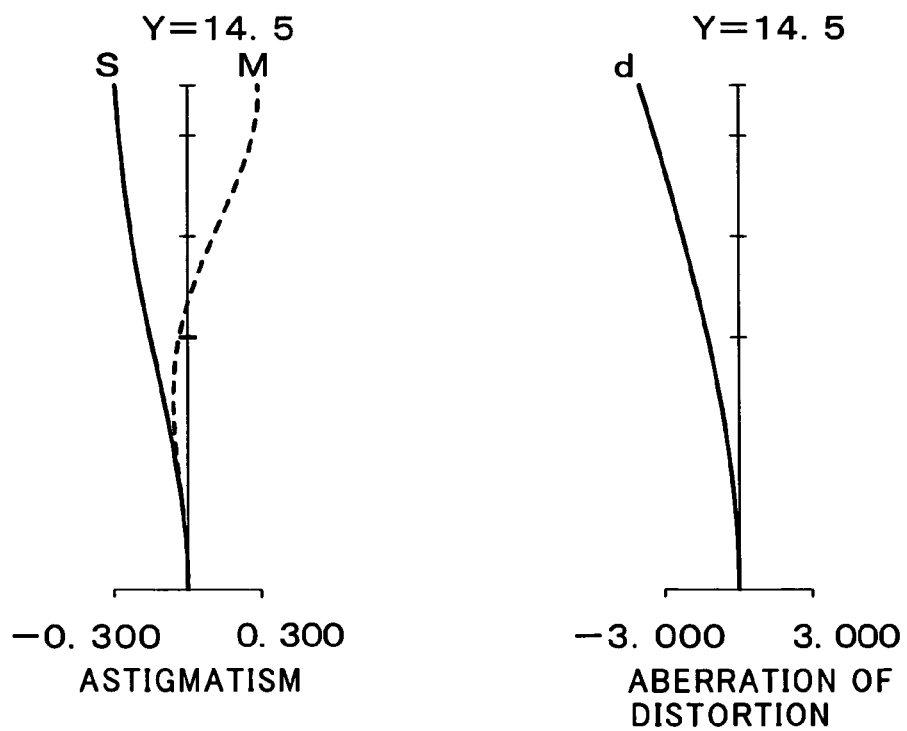

WIDE-ANGLE ZOOM LENS

FIELD OF THE INVENTION

The present invention relates to wide-angle zoom lenses of the increased variable power and the enlarged field angle that are suitably used for single-lens reflex digital cameras having charge coupled devices compatible with an APS-C dimensioned (16.7 mm×23.4 mm) image plane format.

BACKGROUND OF THE INVENTION

In general, wide-angle zoom lenses of 2× or higher in variable power in the state of the arts are of optical architecture primarily having three groups of lens pieces arranged to assume negative, negative, and positive refractivities.

For instance, there has been disclosed a zoom lens of three groups of lens pieces, namely, the 1st to 3rd lens groups, where the 1st lens group assumes negative refractivity, as a whole, and includes the foremost or the first lens piece of negative refractivity closest to objects, the 2nd lens group includes two serial lens pieces succeeding to the first, namely, the second lens piece of positive refractivity and the third lens piece of negative refractivity closer to the image plane, and the 3rd lens group assumes positive refractivity, as a whole, and includes four serial lens pieces, namely, the fourth lens piece of positive refractivity, the fifth lens piece of positive refractivity similar to the fourth, the sixth lens piece of negative refractivity joined to the fifth in a composite lens unit, and the seventh lens piece of the reduced negative refractivity or the reduced positive refractivity. In such a zoom lens, the power is varied by displacing the 1st, 2nd and 3rd lens groups (see Patent Document 1 listed below).

Although an amount of the displacement of those lens groups must be greater and the number of the lens groups must be increased in order to raise the zooming power, another prior art wide-angle zoom lens already disclosed is approximately 75 degrees in field angle and attains the variable power higher than 2×, having its optics relatively reduced in total extension without increase in the space confining the lens groups displaced for varying the power, where there are three groups of lens pieces of negative, negative, and positive refractivities arranged in this order on the closer to objects first basis (see Patent Document 2 listed below).

Further another prior art zoom lens, offering a wider field of view at the wide-angle end, has been disclosed which is comprised of three groups of lens pieces, namely, the 1st lens group of negative refractivity, the 2nd lens group of negative refractivity, and the 3rd lens group of positive refractivity arranged in this order on the closer to objects first basis where the 2nd and 3rd lens groups are displaced along the optical axis for the zooming (see Patent Document 3). This zoom lens makes a wide-angle photo as much as 112 degrees in field angle available, and its Leica 35-mm version can implement a focal length of 14 mm for that field angle.

Still another prior art wide-angle zoom lens, characterized by the field of view as wide as 80 degrees at the wide-angle end, has been disclosed, which has three lens groups respectively assuming negative, negative, and positive refractivities and arranged in this order on the closer to objects first basis (see Patent Document 4 listed below).

Patent Document 1
  Japanese Patent Publication of Unexamined Application 2006-301393

Patent Document 2
  Japanese Patent Publication of Unexamined Application H2-259614

Patent Document 3
  Japanese Patent Publication of Unexamined Application H4-275515

Patent Document 4
  Japanese Patent Publication of Unexamined Application SHO53-103753

The zoom lens as disclosed in the cited Patent Document 1, which includes the lens groups of negative, negative, and positive powers and has the variable power higher than 2×, is advantageous in that the entire optics is reduced in extension, but its field angle of view is at most 75 degrees and cannot attain any further greater field angle as desired in the industry.

The zoom lens as disclosed in the cited Patent Document 2, which includes the lens groups of negative, negative, and positive refractivities, is at most 75 degrees in its widest field angle of view, and this is far behind the further greater field angle as currently desired in the art.

The zoom lens as disclosed in the cited Patent Document 3 has the widest field angle of view as much as 112 degrees that can be implemented by the 14-mm focal length in the Leica 35-mm version, but regretfully its varied power is at most 1.3× or so.

The zoom lens as disclosed in the cited Patent Document 4 has the negative-negative-positive multi lens group configuration and permits photographing of the field of view as wide as 80 degrees at the wide-angle end, but its highest varied power is still not more than 1.6×.

The present invention is made to overcome the aforementioned disadvantages in the prior art wide-angle zoom lens, and accordingly, it is an object of the present invention to provide a wide-angle zoom lens that is capable of covering the field of view ranging from 80 degrees to 115 degrees in field angle with a zooming power of 2× or higher, and is capable of appropriately compensating for various types of aberration such as spherical aberration, aberration of distortion, astigmatism and the like.

It is another object of the present invention to provide a wide-angle zoom lens that has its optics reduced in total extension without increase in the space confining lens groups displaced for varying the power although an amount of the displacement of the lens groups must be greater and the number of the lens groups must be increased in order to raise the zooming power.

It is still another object of the present invention to provide a wide-angle zoom lens that is satisfactorily downsized and reduced in manufacturing cost as desired in the market, which is attained by getting the outermost primary beam incident on the foremost lens surface at a point as close to the optical axis as possible so as to reduce radial dimensions of the optics, especially, an effective diameter of the lens piece closest to objects.

It is further another object of the present invention to provide a wide-angle zoom lens that displaces the trailing lens set (1B) closer to the image plane in the leading or 1st group of lens pieces for the transitive focusing from objects at infinity point to those at near point rather than displacing the 1st lens group in its entirety, so as to reduce an effective diameter of the 1st lens group, and that facilitates actuating the lens groups relatively reduced in dimensions and weight, during the focusing.

SUMMARY OF THE INVENTION

The present invention provides a wide-angle zoom lens of multi groups of lens pieces, namely, the 1st lens group of negative refractivity, the 2nd lens group of negative refractivity, and the 3rd lens group of positive refractivity, that varies the power from the wide-angle end to the telephoto end with the 1st and 2nd lens groups coming closer to each other, and the 2nd and 3rd lens groups being varied in interval therebetween. The zoom lens attains the field of view wider than 80 degrees in field angle, satisfying the requirements as in the following formula:

$$2.0 < ft/fw \quad (1)$$

where fw is a focal length of the entire optics when the zoom lens gets set at the wide-angle end, and ft is the focal length of the entire optics at the telephoto end.

The wide-angle zoom lens according to the present invention is characterized by features as follows:

The zoom lens varies the power, meeting the requirements as in the following formulae:

$$0.8 < |f1/fw| < 3.0 \quad (2)$$

$$1.5 < f3/fw < 4.5 \quad (3)$$

where f1 is the focal length of the 1st lens group, f3 is the focal length of the 3rd lens group, and fw is the focal length of the entire optics when the zoom lens is at the wide-angle end.

The wide-angle zoom lens varies the power in the relations as expressed in the following formula:

$$0.65 < D1w/fw \quad (4)$$

where D1w is an axial aerial distance between the 1st lens group and the 2nd lens group when the zoom lens is at the wide-angle end.

The wide-angle zoom lens attains the field of view wider than 100 degrees in field angle in the relations as expressed in the following formula:

$$|h|/fw < 3.0 \quad (5)$$

$$0.8 < |f1/fw| < 1.6 \quad (6)$$

where f1 is the focal length of the 1st lens group, and h is a distance from the optical axis to a point on which the outermost primary incident beam enters the foremost lens surface closest to objects in the optics.

The wide-angle zoom lens has its 1st lens group comprised of the leading set (1A) of lens pieces of negative refractivity and the trailing set (1B) of lens pieces of negative refractivity, and the trailing set (1B) is displaced toward objects for the transitive focusing from objects at infinity point to those at near point.

<Formulae in the Context of Concepts of the Invention>

In order to ensure the widest field angle ranging from 80 to 115 degrees with the variable power higher than 2×, the multi lens groups of the negative-negative-positive refractivity arrangement on the closer to objects first basis is used to transitively vary the power from the wide-angle end to the telephoto end by the 1st and 2nd lens groups coming closer to each other. An interval between the 1st and 2nd lens groups becomes the largest when the zoom lens is set at the wide-angle end, so that the reduced focal length at the wide-angle end still permits a sufficient back focal length to be ensured. The formula (1) defines the variable power higher than 2×.

The formula (2) defines a rate of the focal length of the 1st lens group to that of the entire optics when the zoom lens is set at the wide-angle end. When the rate exceeds the lower limit as defined in the formula (2), the 1st lens group assumes the reduced focal length, and this is effective to enlarge the field of view but not to correct the aberration of distortion and the astigmatism. When the rate exceeds the upper limit as defined in the formula (2), the 1st lens group assumes the increased focal length, and as a result, it is hard to enlarge the field of view as wide as 80 degrees or even greater in field angle.

The formula (3) defines the rate of the focal length of the 3rd lens group to that of the entire optics when the zoom lens is set at the wide-angle end. When the rate exceeds the lower limit as defined in the formula (3), the 3rd lens group assumes the reduced focal length, and as a result, it is hard to compensate for the spherical aberration and the astigmatism. When the rate exceeds the upper limit as defined in the formula (3), the 3rd lens group assumes the increased focal length, and this resultantly forces the 3rd lens group to be displaced longer so as to vary the power from the wide-angle end to the telephoto end.

The formula (4) defines the rate of the focal length of the axial aerial distance between the 1st and 2nd lens groups when the zoom lens is set at the wide-angle end to the focal length of the entire optics at the wide-angle end. When the rate exceeds the lower limit as defined in the formula (4), the 1st and 2nd lens groups get split farther away from each other, and as a result, it is hard to ensure the back focal length at the wide-angle end.

The formula (5) defines the rate of the focal length of the entire optics at the wide-angle end to the distance from the optical axis to the point on which the outermost primary incident beam enters the foremost lens surface closest to objects in the optics. When the rate exceeds the upper limit as defined in the formula (5), the outermost primary incident beam passes at the higher point on the lens piece closest to objects, and this resultantly forces the zoom lens to be increased in outer diameter.

The formula (6) defines the rate of the focal length of the 1st lens group to that of the entire optics when the zoom lens is set at the wide-angle end. When the rate exceeds the lower limit as defined in the formula (6), the 1st lens group assumes the reduced focal length, and this is effective to widen the field of view but not to correct the aberration of distortion and the astigmatism. When the rate exceeds the upper limit as defined in the formula (6), the 1st lens group assumes the increased focal length, and resultantly, it is hard to cover the field of view as wide as 100 degrees or even higher in field angle.

The hyper wide-angle versions of the zoom lens according to the present invention attain the field of view as wide as 100 degrees or even wider in field angle with the zooming variable power of 2× or above, and are capable of appropriately compensating for the aberration of distortion and the astigmatism.

In addition, the hyper wide-angle versions of the zoom lens according to the present invention has its optics reduced in the total extension without increase in the space confining the lens groups displaced for varying the zooming power although an amount of the displacement of those lens groups must be greater and the number of the lens groups must be increased in order to raise the zooming power.

The hyper wide-angle versions of the zoom lens according to the present invention is advantageous in that it is satisfactorily downsized and reduced in manufacturing cost as desired in the industry, which is attained by getting the outermost primary beam incident on the foremost lens surface at a point as close to the optical axis as possible so as to reduce radial dimensions of the optics, especially, an effective diameter of the lens piece closest to objects.

The hyper wide-angle versions of the zoom lens according to the present invention displace the trailing lens set (1B) closer to the image plane in the 1st group of lens pieces for the transitive focusing from objects at infinity point to those at near point rather than displacing the first lens group in its

BRIEF DESCRIPTION OF THE DRAWINGS

FIG. 2 shows graphs of various types of aberration in the exemplary zoom lens at the wide-angle end.

FIG. 3 shows graphs of the various types of aberration in the exemplary zoom lens at its intermediate focal range.

FIG. 4 shows graphs of the various types of aberration in the exemplary zoom lens at its telephoto end.

FIG. 6 shows graphs of the various types of aberration in the exemplary zoom lens at the wide-angle end.

FIG. 7 shows graphs of the various types of aberration in the exemplary zoom lens at its intermediate focal range.

FIG. 8 shows graphs of the various types of aberration in the exemplary zoom lens at its telephoto end.

FIG. 10 shows graphs of the various types of aberration in the exemplary zoom lens at the wide-angle end.

FIG. 11 shows graphs of the various types of aberration in the exemplary zoom lens at its intermediate focal range.

FIG. 12 shows graphs of the various types of aberration in the exemplary zoom lens at its telephoto end.

FIG. 14 shows graphs of the various types of aberration in the exemplary zoom lens at the wide-angle end.

FIG. 15 shows graphs of the various types of aberration in the exemplary zoom lens at its intermediate focal range.

FIG. 16 shows graphs of the various types of aberration in the exemplary zoom lens at its telephoto end.

BEST MODE OF THE INVENTION

Embodiment 1 f=12.02~15.50~24.58

Zooming Ratio=2.045

Fno=3.9~4.1~4.6

2ω=102.4~88.8~62.7°

Image Height Y=14.5 mm

Figure 1:
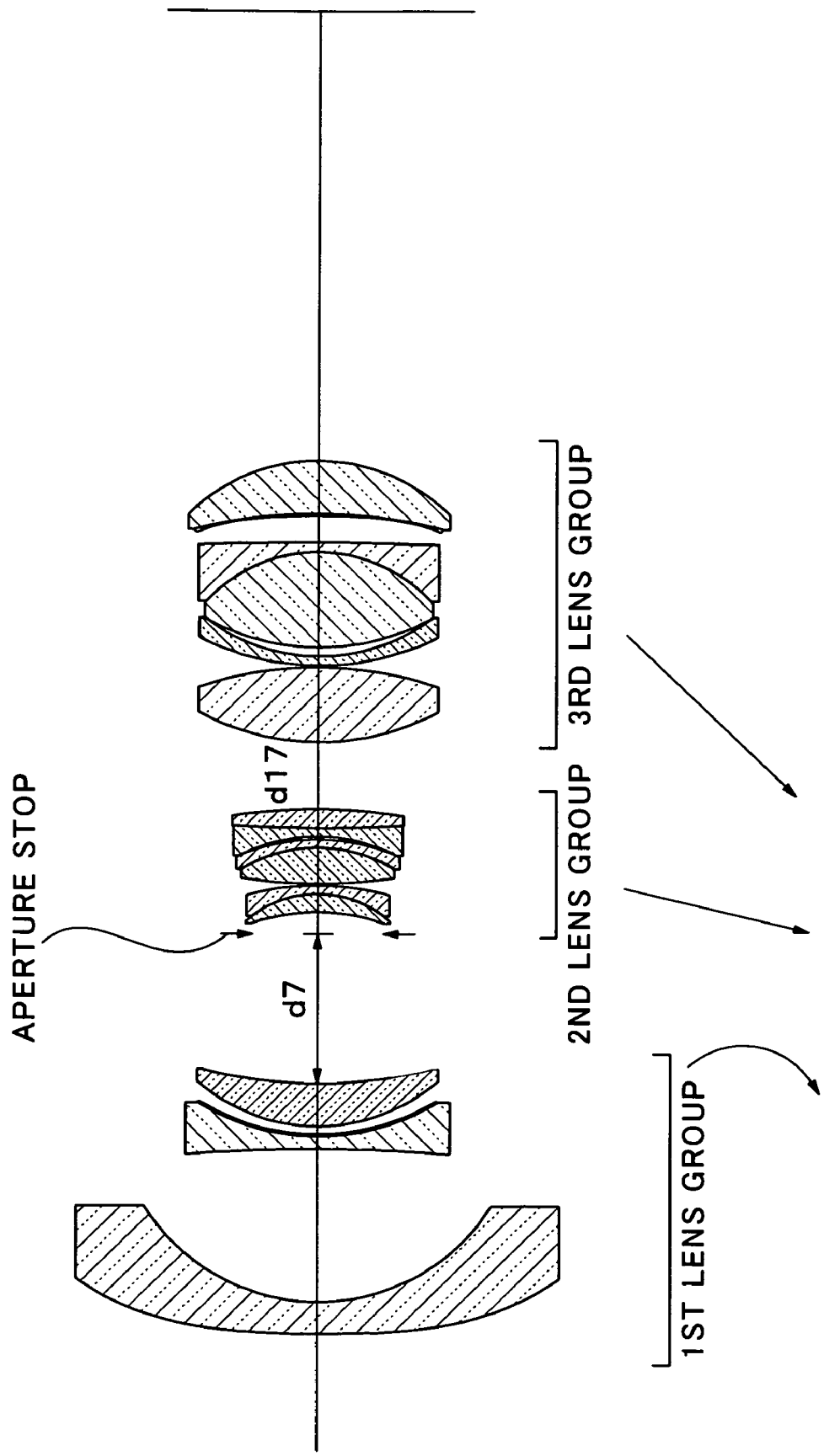
FIG. 1 is a sectional view illustrating a preferred embodiment of a wide-angle zoom lens according to the present invention.
Figure 5:
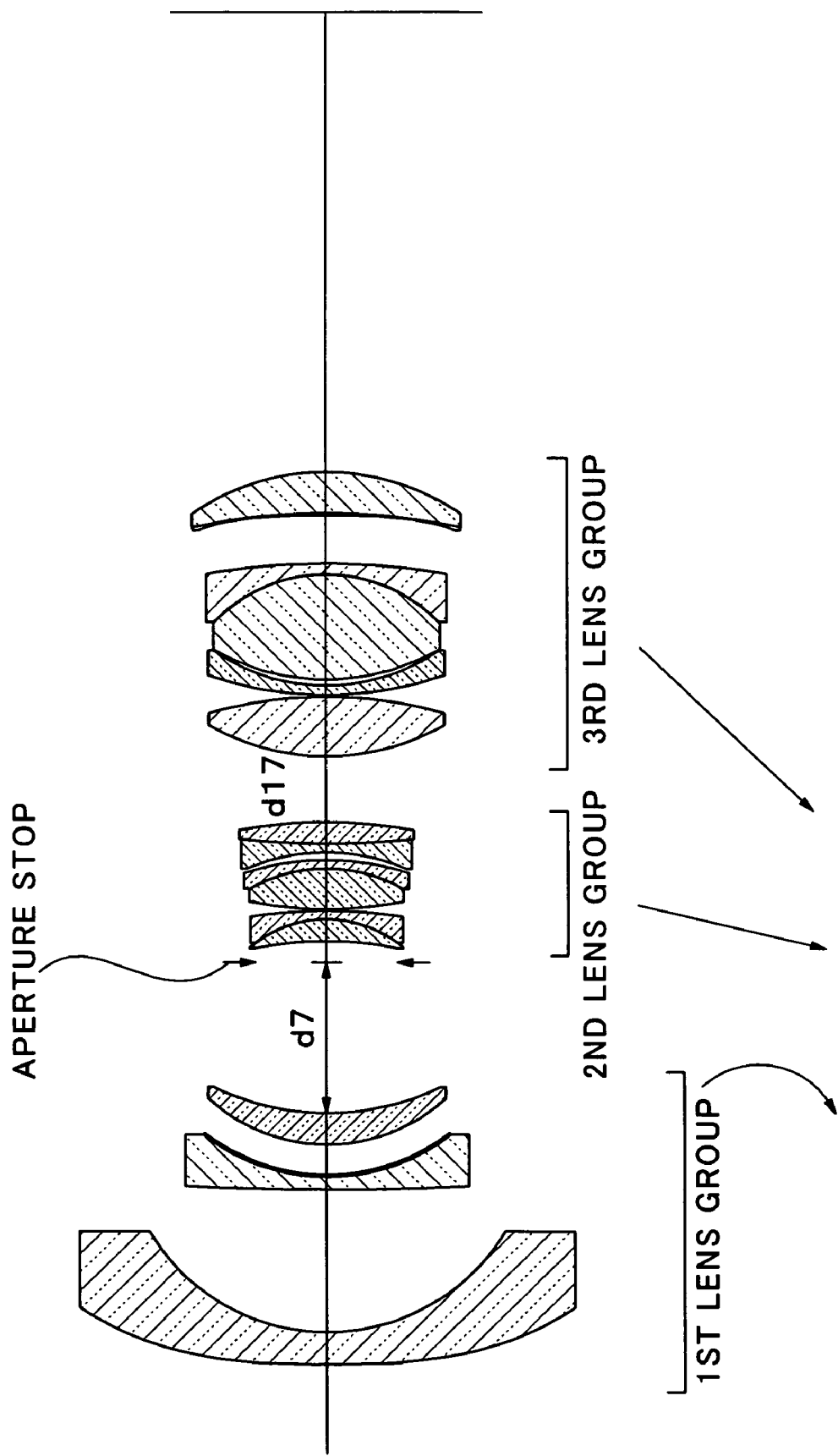
FIG. 5 is a sectional view illustrating another embodiment of the wide-angle zoom lens according to the present invention.
Figure 9:
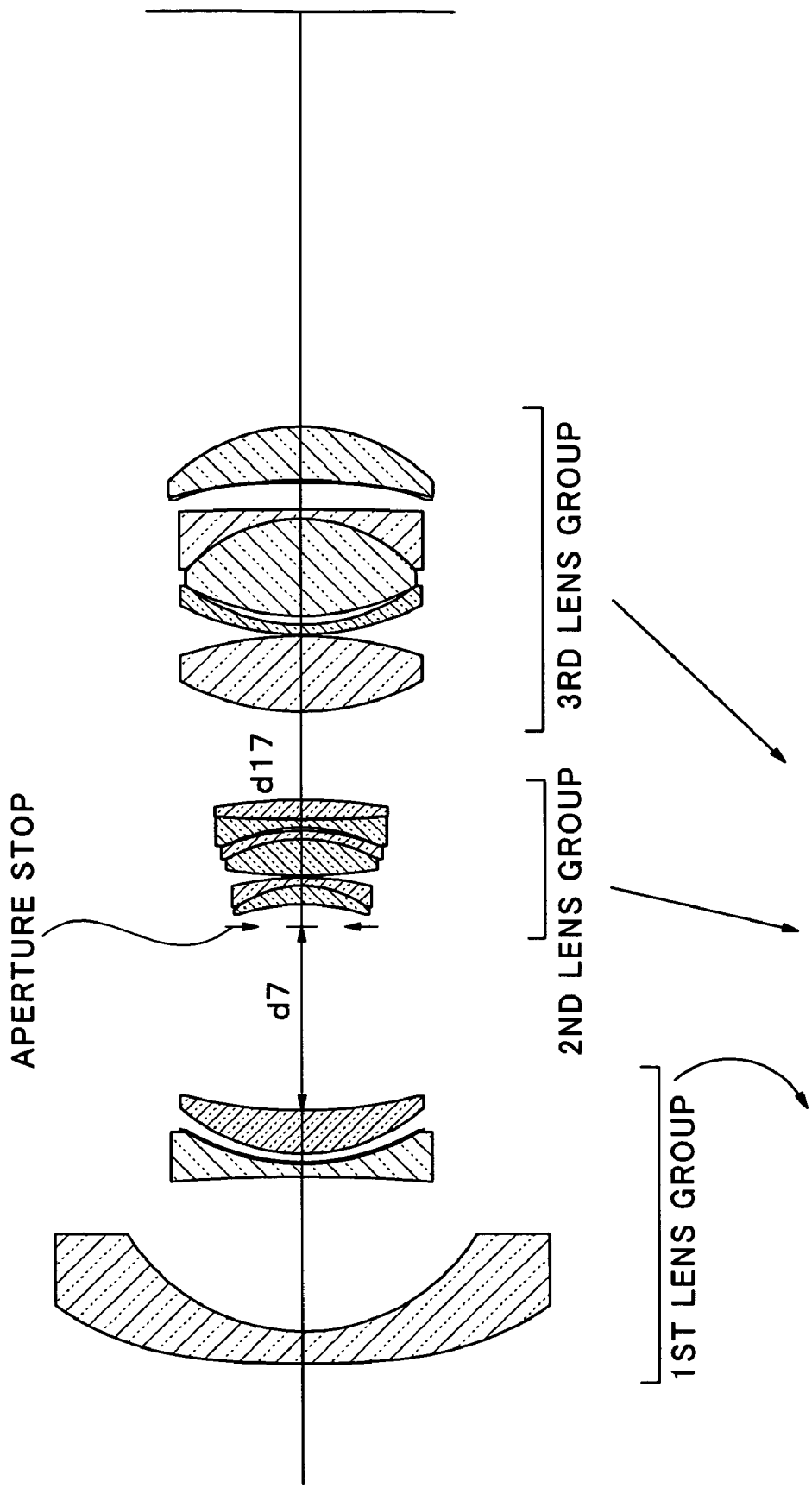
FIG. 9 is a sectional view illustrating still another embodiment of the wide-angle zoom lens according to the present invention.
Figure 13:
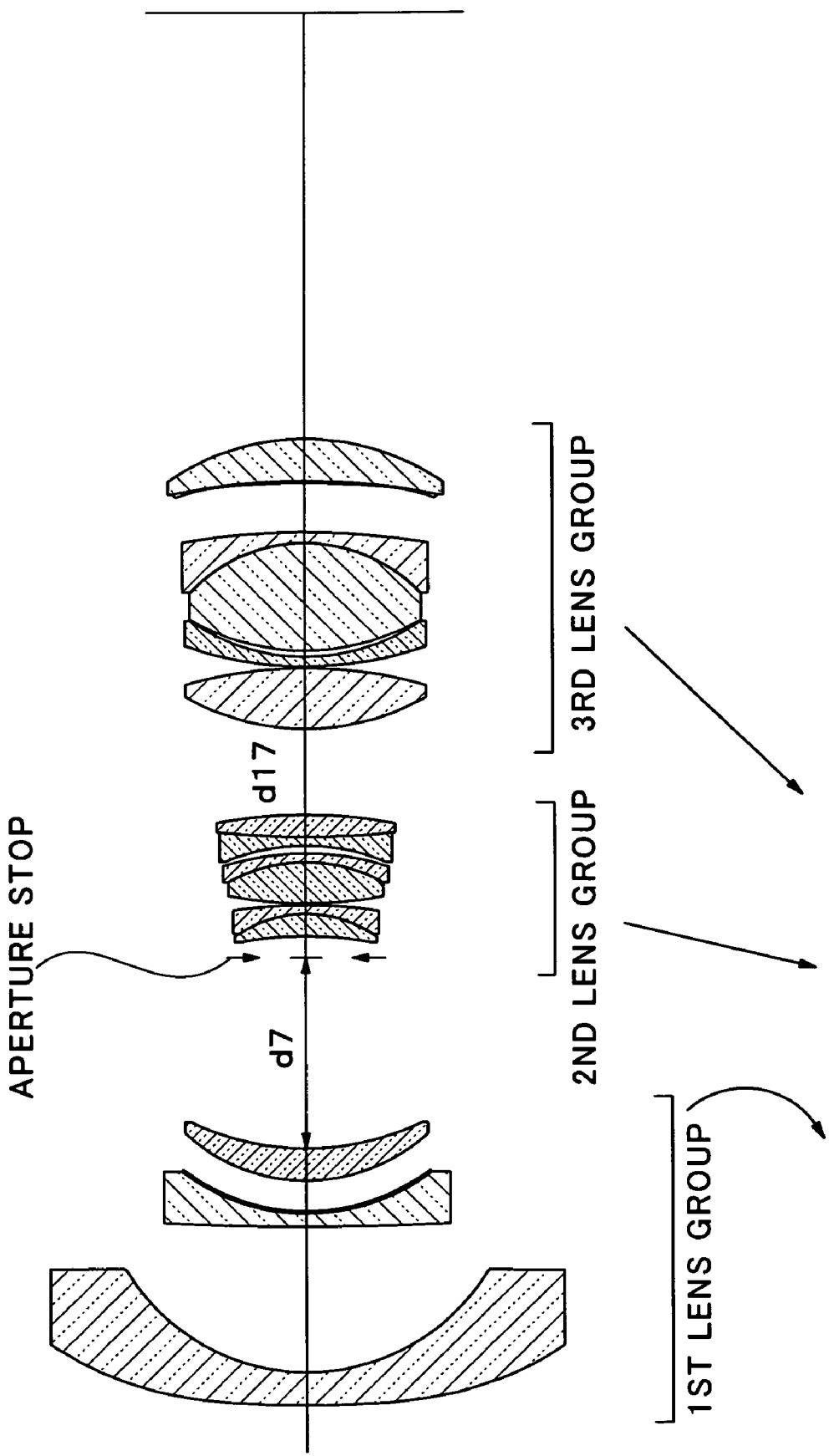
FIG. 13 is a sectional view illustrating further another embodiment of the wide-angle zoom lens according to the present invention.

In the following list of lens data, f is the focal length, Fno is an F number, and 2ω is the field angle. Identification numbers (NO) of the surfaces of the lens pieces are given in the first column, a radius of curvature (R) for each of the lens surface is shown in the second column, the sum (D) of a thickness of each lens piece of the specified surface number and the aerial distance to the next in the third column, a refractive index (Nd) of each specified lens surface at the d-line (wavelength λ=587.6 nm) in the fourth column, and the corresponding Abbe number vd in the fifth column. In the third column, d denotes the aerial distance altered due to varying the power. Any lens surface numbered along with an asterisk (*) in the column 1 is an aspherical surface.

| NO | R | D | Nd | vd |
|---|---|---|---|---|
| 1* | 168.0454 | 3.0000 | 1.74330 | 49.22 |
| 2 | 19.0340 | 14.6291 | 1.00000 | |
| 3 | −156.6511 | 1.2000 | 1.83481 | 42.72 |
| 4 | 21.1955 | 0.2000 | 1.53610 | 41.20 |
| 5* | 22.2937 | 0.7601 | 1.00000 | |
| 6 | 17.1095 | 4.0840 | 1.64769 | 33.84 |
| 7 | 43.8481 | d7 | 1.00000 | |
| 8 (Aperture Stop) | 0.0000 | 2.0990 | 1.00000 | |
| 9 | −19.2718 | 1.7655 | 1.58144 | 40.89 |
| 10 | −10.1756 | 0.8000 | 1.88300 | 40.80 |
| 11 | −25.8363 | 0.1500 | 1.00000 | |
| 12 | 45.5062 | 3.4667 | 1.67270 | 32.17 |
| 13 | −14.0743 | 0.8000 | 1.88300 | 40.80 |
| 14 | −18.7893 | 0.2838 | 1.00000 | |
| 15 | −16.0732 | 0.8000 | 1.88300 | 40.80 |
| 16 | 124.7596 | 1.8203 | 1.92286 | 20.88 |
| 17 | −49.4947 | d17 | 1.00000 | |
| 18 | 23.4316 | 7.1658 | 1.49700 | 81.61 |
| 19 | −34.8784 | 0.1500 | 1.00000 | |
| 20 | 24.6499 | 0.9000 | 1.83400 | 37.34 |
| 21 | 17.5058 | 0.8500 | 1.00000 | |
| 22 | 22.0452 | 9.1447 | 1.49700 | 81.61 |
| 23 | −14.2643 | 0.9000 | 1.90366 | 31.32 |
| 24 | −320.7233 | 2.5402 | 1.00000 | |
| 25* | −89.1125 | 0.2000 | 1.53610 | 41.20 |
| 26 | −47.2459 | 5.0698 | 1.48749 | 70.44 |
| 27 | −17.3284 | BF | 1.00000 | |

Distance Altered Due to Varying the Power

| | f | | |
|---|---|---|---|
| | 12.02 | 15.50 | 24.58 |
| d7 | 14.279 | 9.710 | 4.292 |
| d17 | 6.385 | 3.916 | 0.184 |
| BF | 42.677 | 50.202 | 70.075 |

Entire Extension of the Lens Optics at the Varied Focal Length (From the Foremost Lens Surface to the Image Plane)

| | f | | |
|---|---|---|---|
| | 12.02 | 15.50 | 24.58 |
| OAL | 126.121 | 126.607 | 137.330 |

Focal Length of Each Lens Group

| 1st | −15.405 |
|---|---|
| 2nd | −84.180 |
| 3rd | 27.533 |

A formula expressing the aspherical surface is given by a formula as follows:

$$x = \frac{H^2/r}{1+\sqrt{1-A(H/r)^2}} + A_4H^4 + A_6H^6 + A_8H^8 + A_{10}H^{10} \quad (7)$$

where x is the optical axis, H is a height orthogonal to the optical axis, A is a conical coefficient, An is a factor of the aspherical surface of the n-th degree as expressed by a varied exponent n.

Factor of Aspherical Surface
 (r1)
 A=1.0
 A4=2.39344E-05
 A6=-4.12984E-08
 A8=5.74058E-11
 A10=-2.79066E-14
 (r5)
 A=1.0
 A4=3.28709E-05
 A6=-3.97606E-07
 A8=2.66226E-09
 A10=-7.04849E-12
 (r25)
 A=1.0
 A4=-4.43602E-05
 A6=-4.74406E-09
 A8=-1.80482E-11
 A10=-6.79526E-13

Embodiment 2

Another embodiment of the present invention will now be described in detail in the similar context to the descriptions of the Embodiment 1.

f=12.03~15.50~24.97

Zooming Ratio=2.078

Fno=3.9~4.1~4.7

2ω=103.6~89.5~62.2°

Image Height Y=14.5 mm

| NO | R | D | Nd | vd |
|---|---|---|---|---|
| 1* | 137.4936 | 3.0000 | 1.74330 | 49.22 |
| 2 | 18.9911 | 13.4000 | 1.00000 | |
| 3 | 268.2695 | 1.2000 | 1.72916 | 54.67 |
| 4 | 18.5469 | 0.2000 | 1.53610 | 41.20 |
| 5* | 18.5469 | 2.8169 | 1.00000 | |
| 6 | 16.1048 | 2.9472 | 1.62004 | 36.30 |
| 7 | 23.6938 | d7 | 1.00000 | |
| 8 (Aperture Stop) | 0.0000 | 2.0000 | 1.00000 | |
| 9 | -33.3612 | 2.0595 | 1.64769 | 33.84 |
| 10 | -10.9085 | 0.8000 | 1.88300 | 40.80 |
| 11 | -44.7659 | 0.1500 | 1.00000 | |
| 12 | 35.8376 | 3.8224 | 1.64769 | 33.84 |
| 13 | -14.3469 | 0.8000 | 1.88300 | 40.80 |
| 14 | -24.4555 | 0.7249 | 1.00000 | |
| 15 | -18.3535 | 0.8000 | 1.88300 | 40.80 |
| 16 | 72.3772 | 2.0443 | 1.84666 | 23.78 |
| 17 | -43.1781 | d17 | 1.00000 | |
| 18 | 21.7255 | 5.5932 | 1.49700 | 81.61 |
| 19 | -39.0236 | 0.1500 | 1.00000 | |
| 20 | 32.9738 | 0.9000 | 1.83400 | 37.34 |
| 21 | 18.1690 | 0.5560 | 1.00000 | |
| 22 | 20.7003 | 9.9000 | 1.49700 | 81.61 |
| 23 | -14.2715 | 1.0000 | 1.90366 | 31.32 |
| 24 | -64.8642 | 4.5078 | 1.00000 | |
| 25* | -126.2445 | 0.2000 | 1.51460 | 49.96 |
| 26 | -58.6094 | 3.8793 | 1.48749 | 70.44 |
| 27 | -21.6414 | BF | 1.00000 | |

Distance Varied Due to Varying the Power

| | f | | |
|---|---|---|---|
| | 12.03 | 15.50 | 24.97 |
| d7 | 14.164 | 9.492 | 3.419 |
| d17 | 6.166 | 3.828 | 0.433 |
| BF | 42.780 | 50.485 | 71.570 |

Entire Extension of the Lens Optics at the Varied Focal Length
 (From the Foremost Lens Surface to the Image Plane)

| | f | | |
|---|---|---|---|
| | 12.03 | 15.50 | 24.97 |
| OAL | 126.561 | 127.257 | 138.873 |

Focal Length of Each Lens Group

| 1st | -14.949 |
|---|---|
| 2nd | -95.863 |
| 3rd | 27.608 |

Factor of Aspherical Surface
 (r1)
 A=1.0
 A4=2.10786E-05
 A6=-3.21851E-08
 A8=4.03335E-11
 A10=-1.92222E-14
 (r5)
 A=1.0
 A4=3.03761E-05
 A6=-3.91220E-07
 A8=1.90244E-09
 A10=-4.67552E-12
 (r25)
 A=1.0
 A4=-3.38587E-05
 A6=-5.52442E-08
 A8=2.85975E-10
 A10=-1.91804E-12

Embodiment 3

Further another embodiment of the present invention will now be described in the similar context to the descriptions of the Embodiment 1.

f=10.29~15.50~23.40

Zooming Ratio=2.274

Fno=3.6~4.1~4.6

2ω=109.1~88.8~65.3°

Image Height Y=14.5 mm

| NO | R | D | Nd | vd |
|---|---|---|---|---|
| 1* | 168.0454 | 3.0000 | 1.74330 | 49.22 |
| 2 | 19.0340 | 14.6291 | 1.00000 | |
| 3 | −156.6511 | 1.2000 | 1.83481 | 42.72 |
| 4 | 21.1955 | 0.2000 | 1.53610 | 41.20 |
| 5* | 22.2937 | 0.7601 | 1.00000 | |
| 6 | 17.1095 | 4.0840 | 1.64769 | 33.84 |
| 7 | 43.8481 | d7 | 1.00000 | |
| 8 (Aperture Stop) | 0.0000 | 2.0990 | 1.00000 | |
| 9 | −19.2718 | 1.7655 | 1.58144 | 40.89 |
| 10 | −10.1756 | 0.8000 | 1.88300 | 40.80 |
| 11 | −25.8363 | 0.1500 | 1.00000 | |
| 12 | 45.5062 | 3.4667 | 1.67270 | 32.17 |
| 13 | −14.0743 | 0.8000 | 1.88300 | 40.80 |
| 14 | −18.7893 | 0.2838 | 1.00000 | |
| 15 | −16.0732 | 0.8000 | 1.88300 | 40.80 |
| 16 | 124.7596 | 1.8203 | 1.92286 | 20.88 |
| 17 | −49.4947 | d17 | 1.00000 | |
| 18 | 23.4316 | 7.1658 | 1.49700 | 81.61 |
| 19 | −34.8784 | 0.1500 | 1.00000 | |
| 20 | 24.6499 | 0.9000 | 1.83400 | 37.34 |
| 21 | 17.5058 | 0.8500 | 1.00000 | |
| 22 | 22.0452 | 9.1447 | 1.49700 | 81.61 |
| 23 | −14.2643 | 0.9000 | 1.90366 | 31.32 |
| 24 | −320.7233 | 2.5402 | 1.00000 | |
| 25* | −89.1125 | 0.2000 | 1.53610 | 41.20 |
| 26 | −47.2459 | 5.0698 | 1.48749 | 70.44 |
| 27 | −17.3284 | BF | 1.00000 | |

Distance Varied Due to Varying the Power

| | f | | |
|---|---|---|---|
| | 10.29 | 15.50 | 23.40 |
| d7 | 17.376 | 9.710 | 4.622 |
| d17 | 8.328 | 3.916 | 0.615 |
| BF | 38.871 | 50.202 | 67.412 |

Entire Extension of the Lens Optics at the Varied Focal Length
(From the Foremost Lens Surface to the Image Plane)

| | f | | |
|---|---|---|---|
| | 10.29 | 15.50 | 23.40 |
| OAL | 127.354 | 126.607 | 135.429 |

Focal Length of Each Lens Group

| | |
|---|---|
| 1st | −15.405 |
| 2nd | −84.180 |
| 3rd | 27.533 |

Factor of Aspherical Surface (r1)

A=1.0

$A4=2.39344E-05$ $A6=-4.12984E-08$ $A8=5.74058E-11$ $A10=-2.79066E-14$ (r5)

A=1.0

$A4=3.28709E-05$ $A6=-3.97606E-07$ $A8=2.66226E-09$ $A10=-7.04849E-12$ (r25)

A=1.0

$A4=-4.43602E-05$ $A6=-4.74406E-09$ $A8=-1.80482E-11$ $A10=-6.79526E-13$

Embodiment 4

Yet another embodiment of the present invention will now be detailed in the similar context to the descriptions of the Embodiment 1.

f=10.29~15.50~23.40

Zooming Ratio=2.274

Fno=3.6~4.1~4.6

2ω=111.2~89.5~65.7°

Image Height Y=14.5 mm

| NO | R | D | Nd | vd |
|---|---|---|---|---|
| 1* | 137.4936 | 3.0000 | 1.74330 | 49.22 |
| 2 | 18.9911 | 13.4000 | 1.00000 | |
| 3 | 268.2695 | 1.2000 | 1.72916 | 54.67 |
| 4 | 18.5469 | 0.2000 | 1.53610 | 41.20 |
| 5* | 18.5469 | 2.8169 | 1.00000 | |
| 6 | 16.1048 | 2.9472 | 1.62004 | 36.30 |
| 7 | 23.6938 | d7 | 1.00000 | |
| 8 (Aperture Stop) | 0.0000 | 2.0000 | 1.00000 | |
| 9 | −33.3612 | 2.0595 | 1.64769 | 33.84 |
| 10 | −10.9085 | 0.8000 | 1.88300 | 40.80 |
| 11 | −44.7659 | 0.1500 | 1.00000 | |
| 12 | 35.8376 | 3.8224 | 1.64769 | 33.84 |
| 13 | −14.3469 | 0.8000 | 1.88300 | 40.80 |
| 14 | −24.4555 | 0.7249 | 1.00000 | |
| 15 | −18.3535 | 0.8000 | 1.88300 | 40.80 |
| 16 | 72.3772 | 2.0443 | 1.84666 | 23.78 |
| 17 | −43.1781 | d17 | 1.00000 | |
| 18 | 21.7255 | 5.5932 | 1.49700 | 81.61 |
| 19 | −39.0236 | 0.1500 | 1.00000 | |
| 20 | 32.9738 | 0.9000 | 1.83400 | 37.34 |
| 21 | 18.1690 | 0.5560 | 1.00000 | |
| 22 | 20.7003 | 9.9000 | 1.49700 | 81.61 |
| 23 | −14.2715 | 1.0000 | 1.90366 | 31.32 |
| 24 | −64.8642 | 4.5078 | 1.00000 | |
| 25* | −126.2445 | 0.2000 | 1.51460 | 49.96 |
| 26 | −58.6094 | 3.8793 | 1.48749 | 70.44 |
| 27 | −21.6414 | BF | 1.00000 | |

Distance Altered Due to Varying the Power

|  | f | | |
| --- | --- | --- | --- |
|  | 10.29 | 15.50 | 23.40 |
| d7 | 17.552 | 9.492 | 4.072 |
| d17 | 7.919 | 3.828 | 0.832 |
| BF | 38.889 | 50.485 | 68.066 |

Entire Extension of the Lens Optics at the Varied Focal Length
(From the Foremost Lens Surface to the Image Plane)

|  | f | | |
| --- | --- | --- | --- |
|  | 10.29 | 15.50 | 23.40 |
| OAL | 127.812 | 127.257 | 136.423 |

Focal Length of Each Lens Group

1st −14.949

2nd −95.863

3rd 27.608

Factor of Aspherical Surface (r1)

A=1.0

A4=2.10786E-05

A6=−3.21851E-08

A8=4.03335E-11

A10=−1.92222E-14

(r5)

A=1.0

A4=3.03761E-05

A6=−3.91220E-07

A8=1.90244E-09

A10=−4.67552E-12

(r25)

A=1.0

A4=−3.38587E-05

A6=−5.52442E-08

A8=2.85975E-10

A10=−1.91804E-12

Values for the formulae set forth in conjunction with the aforementioned embodiments of the present invention will be given as follows:

| Formula | Embodiment 1 | Embodiment 2 |
| --- | --- | --- |
| (1) ft/fw | 2.045 | 2.075 |
| (2) \|f1/fw\| | 1.281 | 1.242 |
| (3) f3/fw | 2.290 | 2.294 |

-continued

| (4) D1w/fw | 1.188 | 1.177 |
| --- | --- | --- |
| (5) \|h\|/fw | 1.574 | 1.548 |
| (6) \|f1/fw\| | 1.281 | 1.242 |

| Formula | Embodiment 3 | Embodiment 4 |
| --- | --- | --- |
| (1) ft/fw | 2.274 | 2.274 |
| (2) \|f1/fw\| | 1.497 | 1.452 |
| (3) f3/fw | 2.674 | 2.682 |
| (4) D1w/fw | 1.689 | 1.706 |
| (5) \|h\|/fw | 2.108 | 2.083 |
| (6) \|f1/fw\| | 1.497 | 1.453 |

In graphs illustrating spherical aberration and the sine conditions in the accompanying drawings, Fno denotes the F number, d designates the aberration at the d-line (587.56 nm), g does the aberration at the g-line (435.83 nm), and broken line and a reference symbol 'S.C.' depict the sine conditions.

In the graphs illustrating chromatic aberration of magnification, chromatic aberration at the g-line relative to that at the d-line is depicted. The image height is given by Y=14.5.

In the graphs illustrating astigmatism, the aberration at the d-line is depicted. Solid line and a reference symbol 'S' depicts aberration of sagittal image distortion while the broken line shows aberration of meridian image distortion. The height of the image is given by Y=14.5.

In the graphs illustrating aberration of distortion, the aberration at the d-line is depicted in percentages (%). The height of the image is given by Y=14.5.

What is claimed is:

1. A wide-angle zoom lens comprising:
  a plurality of groups of lens pieces including
    a 1st lens group of negative refractivity;
    a 2nd lens group of negative refractivity; and
    a 3rd lens group of positive refractivity all lens groups arranged in the recited order on a closer to objects first basis, that varies power from a wide-angle end to a telephoto end with the 1st and 2nd lens groups coming closer to each other, and the 2nd and 3rd lens groups being varied in interval therebetween, the zoom lens attaining a field of view wider than 80 degrees in field angle, satisfying the requirements in the following formula:

$2.0 < ft/fw$ where fw is the focal length of the entire optics when the zoom lens gets set at the wide-angle end, and ft is the focal length of the entire optics at the telephoto end and
wherein the zoom lens varies the power, satisfying the requirements as in the following formulae:

$0.8 < |f1/fw| < 3.0$ and $1.5 < f3/fw < 4.5$ where f1 is the focal length of the 1st lens group, f3 is the focal length of the 3rd lens group, and fw is the focal length of the entire optics when the zoom lens is at the wide-angle end.

2. A wide-angle zoom lens with an optical axis, the lens comprising:
  a plurality of groups of lens pieces including
    a 1st lens group of negative refractivity;
    a 2nd lens group of negative refractivity; and
    a 3rd lens group of positive refractivity, all lens groups arranged in the recited order on a closer to objects first basis, that varies power from a wide-angle end to a telephoto end with the 1st and 2nd lens groups coming closer to each other, and the 2nd and 3rd lens groups being varied in interval therebetween, the zoom lens attaining a field of view wider than 80 degrees in field angle, satisfying the requirements in the following formula:

$$2.0 < ft/fw$$

where fw is the focal length of the entire optics when the zoom lens gets set at the wide-angle end, and ft is the focal length of the entire optics at the telephoto end and
the zoom lens attains the field of view wider than 100 degrees in field angle, satisfying the requirements as in the following formula:

$$|h|/fw < 3.0 \text{ and}$$

$$0.8 < |f1|/fw < 1.6$$

where f1 is the focal length of the 1st lens group, and h is a distance from the optical axis to a point on which the outermost primary incident beam enters the foremost lens surface closest to objects in the optics.

3. A wide-angle zoom lens comprising:
 a plurality of groups of lens pieces including
  a 1st lens group of negative refractivity;
  a 2nd lens group of negative refractivity; and
  a 3rd lens group of positive refractivity all lens groups arranged in the recited order on a closer to objects first basis, that varies power from a wide-angle end to a telephoto end with the 1st and 2nd lens groups are coming closer to each other, and the 2nd and 3rd lens groups are varied in interval therebetween, the zoom lens attaining a field of view wider than 80 degrees in field angle, satisfying the requirements in the following formula:

$$2.0 < ft/fw$$

where fw is the focal length of the entire optics when the zoom lens gets set at the wide-angle end, and ft is the focal length of the entire optics at the telephoto end and
the zoom lens has its 1st lens group comprised of the leading set of lens pieces of negative refractivity and the trailing set of lens pieces of negative refractivity, and the trailing set is displaced toward objects for the transitive focusing from objects at infinity point to those at near point.

* * * * *